(12) United States Patent  
Yu et al.

(10) Patent No.: US 9,226,054 B2  
(45) Date of Patent: Dec. 29, 2015

(54) MOBILE COMMUNICATION TERMINAL

(71) Applicant: Samsung Display Co., Ltd., Yongin, Gyeonggi-Do (KR)

(72) Inventors: Jae-Young Yu, Yongin (KR); Sung-Sang Ahn, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 282 days.

(21) Appl. No.: 14/018,636

(22) Filed: Sep. 5, 2013

(65) Prior Publication Data

US 2014/0079231 A1      Mar. 20, 2014

(30) Foreign Application Priority Data

Sep. 17, 2012    (KR) .......................... 10-2012-0102877

(51) Int. Cl.
```
H04R 29/00      (2006.01)
H04R 1/02       (2006.01)
H04M 1/03       (2006.01)
H04M 1/02       (2006.01)
```
(52) U.S. Cl.
CPC ............... *H04R 1/02* (2013.01); *H04M 1/0281* (2013.01); *H04M 1/03* (2013.01); *H04M 2250/12* (2013.01)

(58) Field of Classification Search
CPC ........ H04R 1/02; H04M 1/0281; H04M 1/03; H04M 2250/12; H04M 1/72569; H04M 1/0235; H04M 1/72522; H04M 1/7253; H04M 1/72583; H04M 11/00; H04M 1/0202; H04M 1/021; H04M 1/0222; H04M 1/0266; H04M 1/21; H04M 1/72536
USPC .................. 381/55–59, 150, 386, 388, 306; 455/550.1, 566, 556.1, 556.2
See application file for complete search history.

(56) References Cited

U.S. PATENT DOCUMENTS

| | | | |
|---|---|---|---|
| 8,150,079 B2 * | 4/2012 | Maeda et al. .................. 381/306 |
| 2008/0032748 A1 * | 2/2008 | Choi et al. ..................... 455/566 |
| 2009/0280860 A1 * | 11/2009 | Dahlke ......................... 455/556.1 |
| 2010/0062804 A1 * | 3/2010 | Yonemochi ................. 455/556.1 |
| 2011/0268292 A1 * | 11/2011 | Suvanto et al. .................. 381/92 |

FOREIGN PATENT DOCUMENTS

| | | |
|---|---|---|
| KR | 10-2003-0062015 | 7/2003 |
| KR | 10-2005-0011980 | 1/2005 |
| KR | 10-2005-0053161 | 6/2005 |

* cited by examiner

*Primary Examiner* — Lun-See Lao  
(74) *Attorney, Agent, or Firm* — Robert E. Bushnell, Esq.

(57) ABSTRACT

A mobile communication terminal including: a window glass provided on a front side of a terminal main body; a speaker hole formed on an edge of the terminal main body corresponding to an edge of an outer portion of the window glass, exposed to the outside, and formed to correspond to a speaker provided in the terminal main body; and a sensor connected to the speaker, and sensing a direction in which the terminal main body is slanted, wherein the sensor controls the speaker to open or close the speaker hole according to the direction in which the terminal main body is slanted.

18 Claims, 6 Drawing Sheets

MOBILE COMMUNICATION TERMINAL

CLAIM PRIORITY

This application makes reference to, incorporates the same herein, and claims all benefits accruing under 35 U.S.C. §119 from an application earlier filed in the Korean Intellectual Property Office on 17 Sep. 2012 and there duly assigned Serial No. 10-2012-0102877.

BACKGROUND OF THE INVENTION

1. Field of the Invention

The described technology relates generally to a mobile communication terminal.

2. Description of the Related Art

In general, a mobile communication terminal includes a speaker for a person to listen to a sound during a call. Recently, terminals for receiving and reproducing multimedia contents (e.g., motion pictures or MP3 files) have appeared, and the speakers have developed from monophonic speakers to stereophonic speakers. As multimedia functions have been reinforced for the mobile communication terminals, structures for listening to stereo sound have been suggested.

The above information disclosed in this Related Art section is only for enhancement of understanding of the background of the described technology and therefore it may contain information that does not form the prior art that is already known in this country to a person of ordinary skill in the art.

SUMMARY OF THE INVENTION

The described technology has been made in an effort to provide a method for forming a speaker hole in a main body of an outer portion of a window glass instead of directly forming the speaker hole in the window glass, and thereby improving a yield and integrity of the window glass, and forming a plurality of speaker holes and thereby providing stereo sound.

An exemplary embodiment provides a mobile communication terminal including: a window glass provided on a front side of a terminal main body; a speaker hole formed on an edge of the terminal main body corresponding to an edge of an outer portion of the window glass, exposed to an outside, and formed to correspond to a speaker provided in the terminal main body; and a sensor connected to the speaker, and sensing a direction in which the terminal main body is slanted, wherein the sensor controls the speaker to open or close the speaker hole according to the direction in which the terminal main body is slanted.

The sensor may be an acceleration sensor for switching a screen of a terminal display.

The speaker hole includes a first speaker hole and a second speaker hole provided to a right edge and a left edge at a top of the terminal main body, respectively.

When the top of the terminal main body is slanted in a first direction, the first speaker hole may be opened and the second speaker hole may be closed, and when the top of the terminal main body is slanted in a second direction, the second speaker hole may be opened and the first speaker hole may be closed.

The speaker hole includes a first speaker hole and a second speaker hole that are provided to a right edge and a left edge at a top of the terminal main body, respectively, and a third speaker hole and a fourth speaker hole that are provided to a right edge and a left edge at a bottom of the terminal main body, respectively.

When the top of the terminal main body is inclined in the first direction, the first speaker hole may be opened and the second speaker hole may be closed, and when the top of the terminal main body is inclined in the second direction, the second speaker hole may be opened and the first speaker hole may be closed, and the third speaker hole and the fourth speaker hole are closed.

The speaker holes are opened when the terminal main body stands in the vertical direction.

A curvature radius of an outer portion edge of the window glass may be formed to be greater than a curvature radius of an outer portion edge of the terminal main body.

An outer portion edge of the window glass has a corner-cutting form forming a straight line.

According to an embodiment, the speaker hole may be formed at the edge of the terminal main body corresponding to the edge of the outer portion of the window glass to eliminate the shaping process for forming the speaker hole inside the window glass, and eliminating the chipping and cracks to improve the yield.

Also, the speaker hole in the window glass that is weak in rigidity is eliminated to improve the rigidity of the window glass, and a plurality of speaker holes are formed to provide stereo sound.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
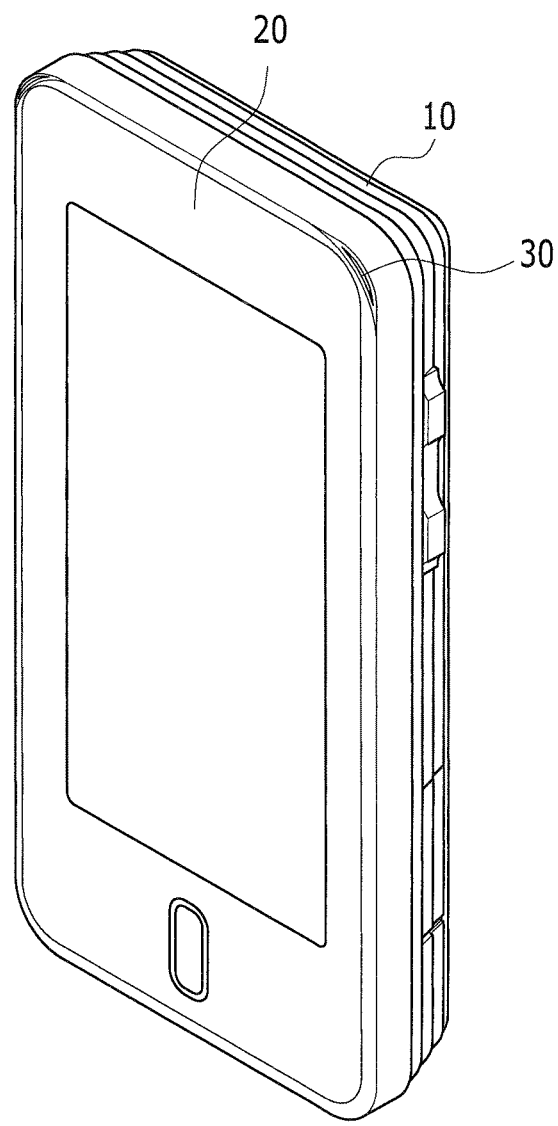
FIG. 1 shows a perspective view of a mobile communication terminal according to an exemplary embodiment.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention.

Further, in several exemplary embodiments, constituent elements having the same construction are assigned the same reference numerals and are representatively described in connection with a first exemplary embodiment. In the remaining exemplary embodiments, only different constituent elements from those of the first exemplary embodiment are described.

The drawings are schematic and are not proportionally scaled. Relative scales and ratios in the drawings are enlarged or reduced for the purpose of accuracy and convenience, and the scales are arbitrary such that the embodiments are not limited thereto. In addition, like reference numerals designate like structures, elements, or parts throughout the specification. It will be understood that when an element is referred to as being "on" another element, it can be directly on another element or intervening elements may be present therebetween.

Exemplary embodiments views represent ideal exemplary embodiments in detail. Resultantly, various modifications of diagrams are expected. Accordingly, the exemplary embodiments are not limited to specific shapes of shown regions, and for example, also include modifications of the shape by manufacturing.

Frequently a mobile communication terminal includes a speaker hole for expressing sound transmitted by the speaker to the outside. Regarding recently sold terminals such as smart phones that are not of a folder type, a speaker hole is initially processed in the terminal at the bottom of a window glass, and a hole is formed in the window glass. In this case, when the hole is processed in the window glass, a shape inferiority rate such as chipping and cracks is substantially high and such the problems cause deterioration of integrity of the window glass.

A mobile communication terminal according to an exemplary embodiment will now be described with reference to FIG. 1 to FIG. 3.

FIG. 1 shows a perspective view of a mobile communication terminal according to an exemplary embodiment.

Referring to FIG. 1, the mobile communication terminal according to an exemplary embodiment includes a window glass 20 provided on a front surface of a terminal main body 10, a speaker hole 30, and a sensor (not shown). A terminal of a general mobile phone may be usable for the terminal main body 10, and a shape of the speaker hole is not formed inside the terminal main body 10. The speaker hole 30 can be formed at both sides of the edge of the terminal main body 10 corresponding to the edge of the outer portion of the top of the window glass 20 so that it may be exposed to the outside. A user can hear a sound received from a caller through the speaker hole 30, and can also hear sound when listening to music or watching movies or TV. In FIG. 1, the speaker hole 30 may be provided to have an oval shape that may be bent on both sides of the top outer portion, and the number, position, and shape of the speaker hole 30 is not restricted so a plurality of holes can be provided or it can be a straight line or a curved line. A speaker (not shown) may be installed in the terminal main body 10, and the speaker hole 30 can be formed to correspond to the speaker.

In addition, a sensor may be installed in the terminal main body 10, and it may be connected to the speaker inside the main body 10. An acceleration sensor is generally used as the sensor for switching display of the mobile phone. The acceleration sensor can sense a direction in which the terminal main body 10 is slanted. The speaker hole 30 may be opened or closed according to the slanted direction of the terminal main body 10 sensed by the sensor.

In this instance, the opening or closing of the speaker hole 30 signifies that the sensor controls the speaker according to the direction in which the terminal main body is slanted, so when the sensor senses the slanted direction of the terminal main body and transmits a predetermined opening signal to the speaker as an electrical signal according to the slanted direction, the speaker may be activated and generates sound. Therefore, the sound may be generated through the speaker hole 30 corresponding to the activated speaker (i.e., the speaker hole is opened). On the contrary, when the sensor transmits a predetermined closing signal to the speaker as an electrical signal according to the slanted direction, the speaker may be inactivated and generates no sound. Therefore, the sound is not generated through the speaker hole 30 corresponding to the inactivated speaker (i.e., the speaker hole is closed).

FIG. 2(A) and (B) show opening and closing of a speaker hole depending on a gradient direction of a mobile communication terminal according to an exemplary embodiment. In this instance, when a direction that is perpendicular to the horizontal direction is called a vertical direction, a right angle direction on the right side with respect to the vertical direction will be called a first direction and a right angle direction on the left side with respect to the vertical direction will be called a second direction. Therefore, the first direction is opposite the second direction.

Referring to FIG. 2(A), when the uses holds the terminal by the right hand and makes a call, the terminal main body 10 is naturally slanted in the first direction, and the right ear of the user fits a left speaker hole (the first speaker hole hereinafter) 32 from among the speaker holes that are formed on both outer portions of the window glass 20. The acceleration sensor has an acceleration sensor sensing axis, a virtual axis directing a gravity direction, and when the acceleration sensor senses that the top of the terminal main body 10 is slanted in the first direction with respect to the acceleration sensor sensing axis, the first speaker hole 32 may be opened and the right speaker hole (a second speaker hole hereinafter) 34 may be closed. Therefore, the user can listen to the receiving sound from the caller through the first speaker hole 32 at the right ear of the user.

On the contrary, as shown in FIG. 2(B), when the users holds the terminal by the left hand and makes a call, the terminal main body 10 is naturally inclined in the second direction, and the left ear of the user fits the second speaker hole 34 formed in the outer portion of the window glass 20. When the acceleration sensor senses that the top of the terminal main body 10 is slanted in the second direction with respect to the acceleration sensor sensing axis, the second speaker hole 34 may be opened and the first speaker hole 32 may be closed. Therefore, the user can listen to the sound received from the caller through the second speaker hole 34 at the left ear of the user.

Figure 3:
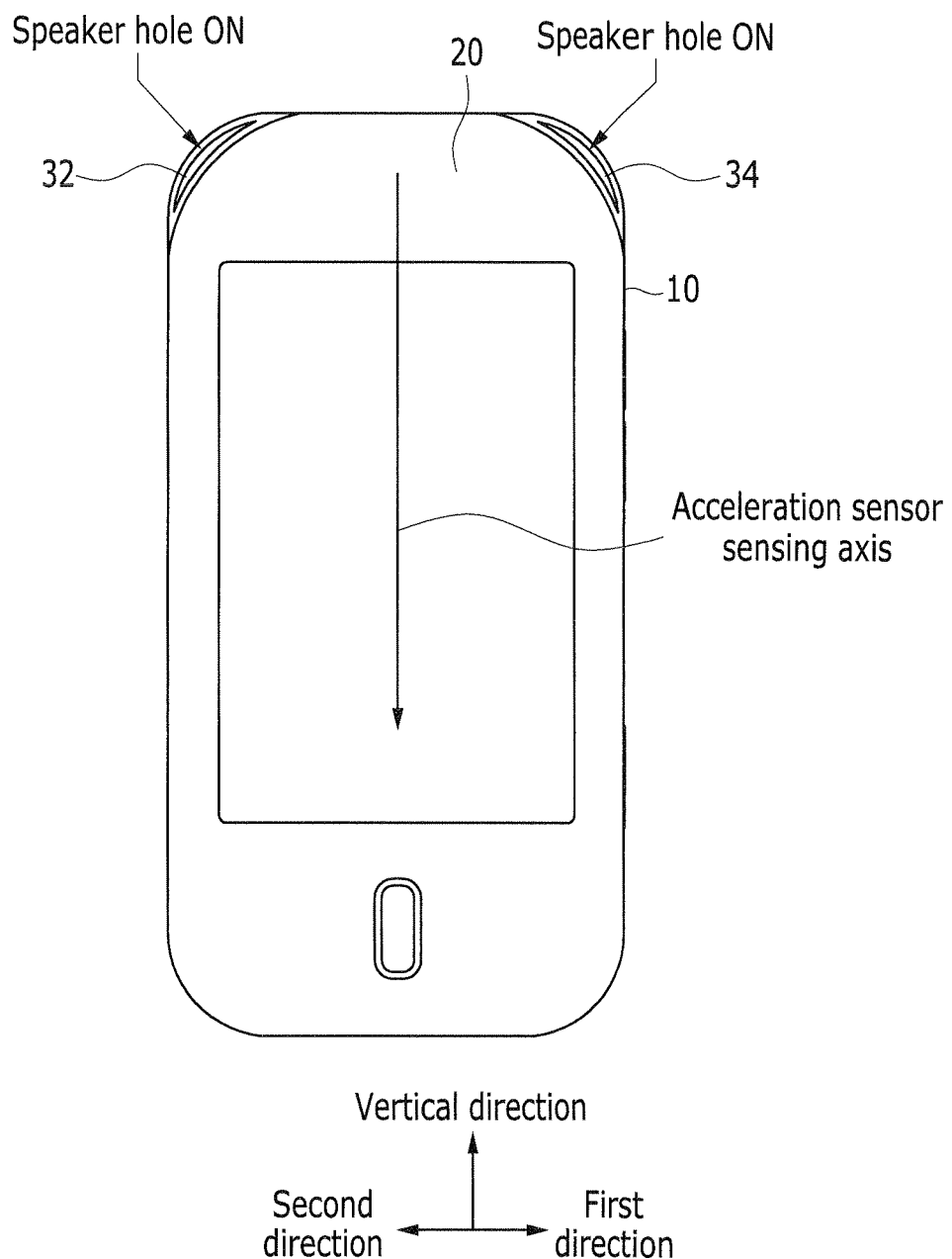
FIG. 3 shows an opening state of a speaker hole when a mobile communication terminal according to an exemplary embodiment is provided in a vertical direction.

FIG. 3 shows an opening state of a speaker hole when a mobile communication terminal according to an exemplary embodiment is provided in a vertical direction.

Referring to FIG. 3, when the terminal main body is not inclined to the first direction or the second direction, that is, when it stands in the vertical direction with respect to the horizontal plane, the acceleration sensor senses that the acceleration sensor sensing axis corresponds to the vertical direction and the first speaker hole 32 and the second speaker hole 34 are opened. In this instance, the vertical direction does not need to be accurate at 90 degrees with respect to the horizontal plane, and the acceleration sensor can have sensitivity that is appropriate for switching the display of the mobile phone and can have a slanted angle range from right to left before the display screen is switched. While the terminal main body 10 stands in the vertical direction, the first and second speaker holes 32 and 34 are opened and the user can listen to stereo sound through the speaker holes 32 and 34 when listening to music or watching movies or TV.

Figure 2:
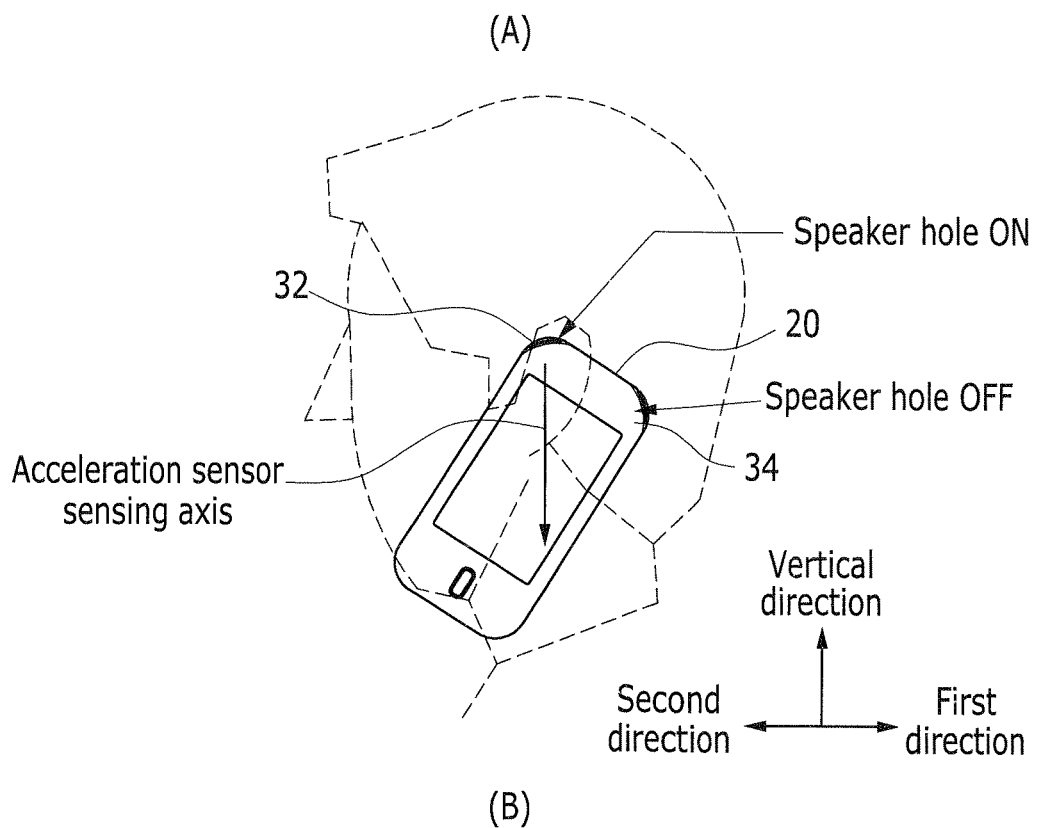
FIG. 2 shows opening and closing of a speaker hole depending on a gradient direction of a mobile communication terminal according to an exemplary embodiment.
Figure 2:
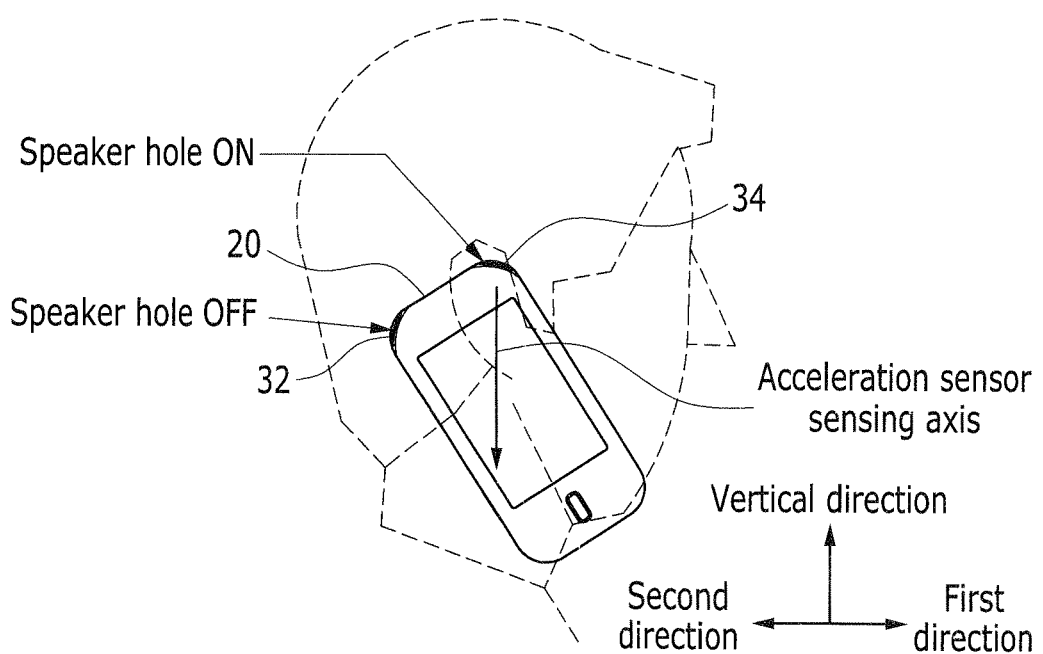

In the mobile communication terminal according to the exemplary embodiment shown with reference to FIG. 1 to FIG. 3, a curvature radius of the outer portion edge of the window glass 20 may be formed to be greater than the curvature radius of the outer portion edge of the terminal main body 10.

Figure 4:
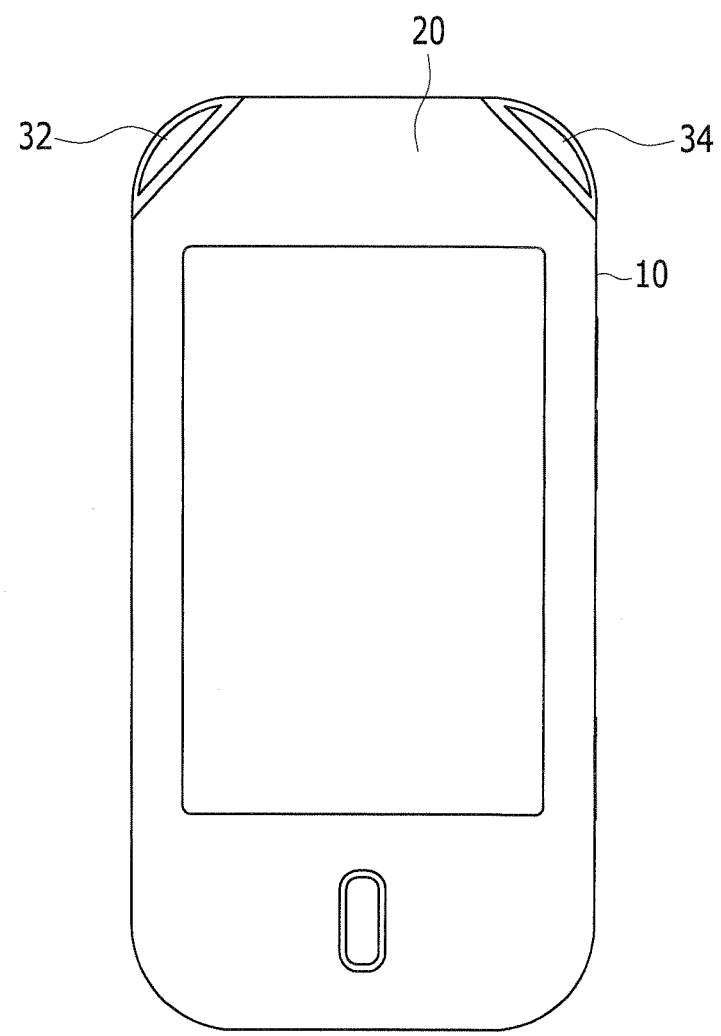
FIG. 4 shows a front view of a mobile communication terminal according to another exemplary embodiment.

FIG. 4 shows a front view of a mobile communication terminal according to another exemplary embodiment. The outer portion edge of the window glass of the mobile communication terminal shown in FIG. 4 can have a corner-cutting shape with a straight line portion.

Figure 5:
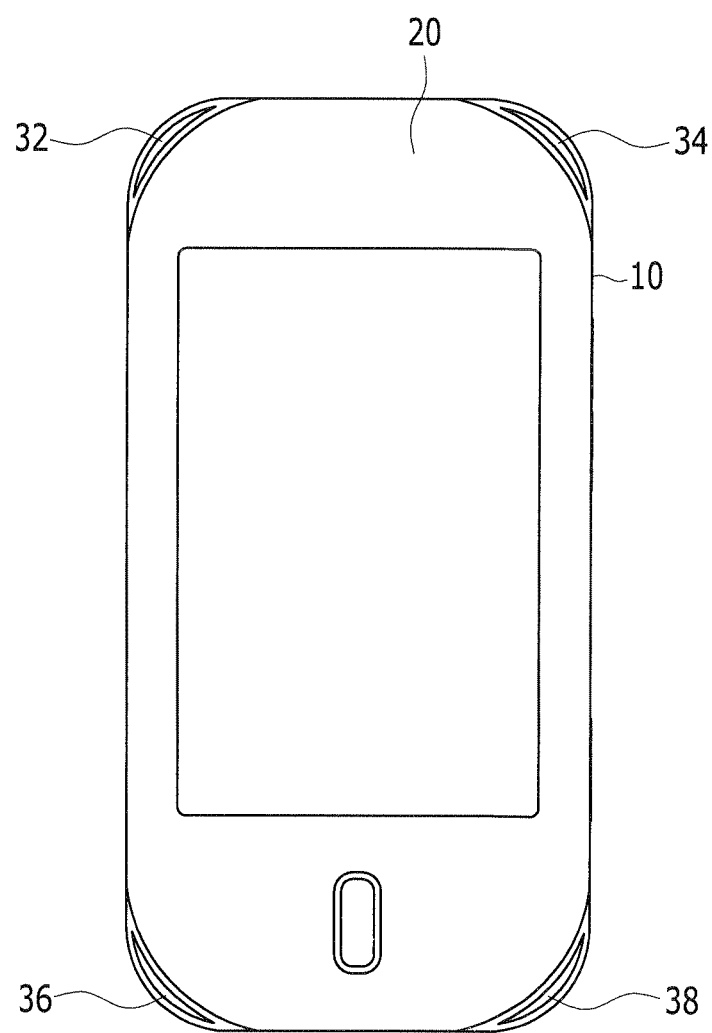
FIG. 5 shows a front view of a mobile communication terminal according to the other exemplary embodiment.

FIG. 5 shows a front view of a mobile communication terminal according to the another exemplary embodiment. Referring to FIG. 5, the speaker holes (32, 34, 36, and 38) include a first speaker hole 32 and a second speaker hole 34 respectively provided on right and left edges at the top of the terminal main body 10, and a third speaker hole 36 and a fourth speaker hole 38 respectively provided on right and left edges at the bottom of the terminal main body 10. The number, positions, and shapes of speaker holes are not restricted to those of the speaker holes shown in FIG. 5, that is, four speaker holes can be provided, and they can be realized in various shapes such as straight lines or curved lines at the top and side of the window glass 20.

As described with reference to FIG. 2 and FIG. 3, in the case of the mobile communication terminal according to the present exemplary embodiment shown in FIG. 5, an acceleration sensor may be installed in the terminal main body 10, and when the user holds the terminal by the hand and makes a call, the terminal main body 10 is inclined in the first direction, the first speaker hole 32 may be opened, and the second speaker hole 34 may be closed. On the contrary, when the user holds the terminal by the left hand and makes a call, the terminal main body 10 is inclined in the second direction, the second speaker hole 34 may be opened, and the first speaker hole 32 may be closed. Therefore, the opened speaker hole fits the user's ear according to the inclined direction of the terminal main body 10 so the user can listen to the sound received from the caller.

In addition, when the terminal main body 10 is slanted in the first direction or the second direction in the present exemplary embodiment, the third and fourth speaker holes 36 and 38 on both outer portions at the bottom can be closed.

Figure 6:
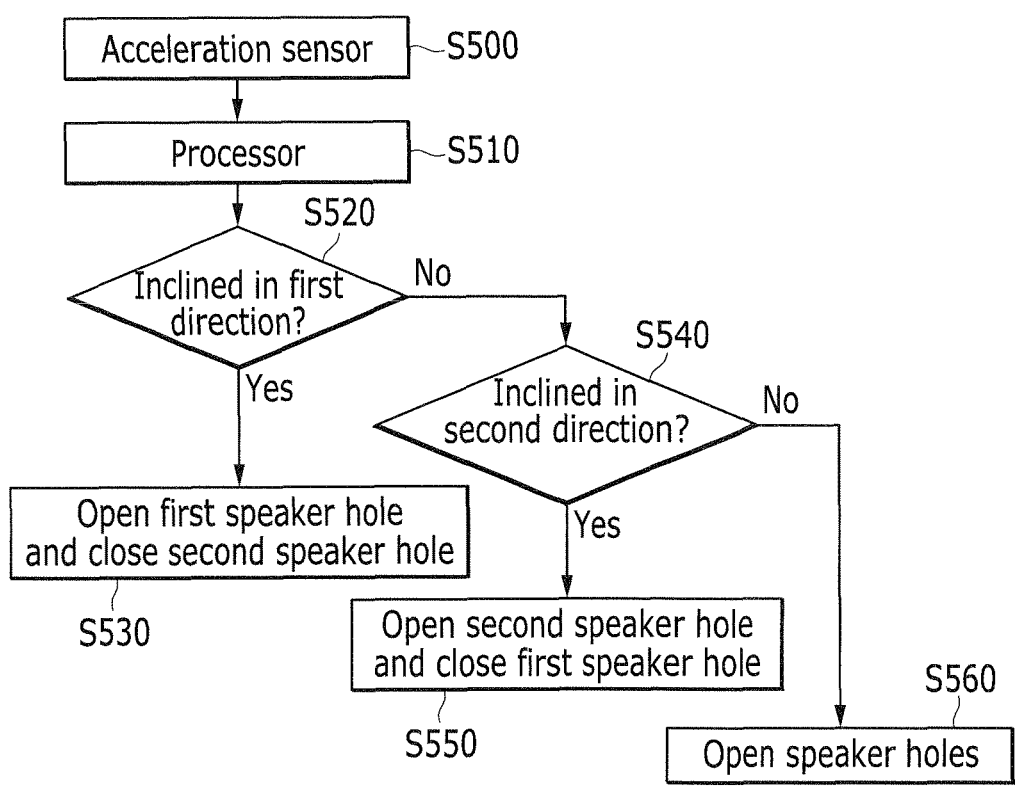
FIG. 6 shows a method for determining opening and closing of a speaker hole with respect to a gradient direction of a mobile communication terminal according to exemplary embodiments.

FIG. 6 shows a method for determining opening and closing of a speaker hole with respect to a gradient direction of a mobile communication terminal according to exemplary embodiments. Referring to FIG. 5, the acceleration sensor installed in the terminal main body 10 has an acceleration sensor sensing axis that is a virtual axis directing the gravity direction, and it senses whether the top of the terminal main body 10 is inclined in the first direction or the second direction with respect to the acceleration sensor sensing axis or whether the terminal main body 10 stands in the vertical direction (S500). Gradient direction data of the sensed terminal main body 10 are transmitted to a processor, and the processor analyzes the gradient direction data to control opening and closing of the speaker hole of the terminal main body 10 (S510). When the gradient direction data are determined to be slanted in the first direction by the processor (S520), the first speaker hole 32 may be opened and the second speaker hole 34 may be closed (S530).

When the gradient direction data are determined to be inclined in the second direction (S540), the second speaker hole 34 may be opened and the first speaker hole 32 may be closed (S550).

Further, when the gradient direction data is determined to be inclined in neither the first direction nor the second direction, that is, the terminal main body 10 is determined to stand in the vertical direction, the speaker holes (32, 34, 36, and 38) formed in the window glass 20 may be opened (S560).

Accordingly, by using the mobile communication terminal having the window glass in which a speaker hole is formed according to the exemplary embodiment, the shape process for forming a speaker hole inside the window glass is reduced, and chipping and cracks are eliminated to improve the yield. Further, the internal speaker hole that is weak in rigidity is eliminated to improve the integrity of the window glass, and the speaker hole for at least two points is formed to provide the stereo sound effect.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A mobile communication terminal, comprising:
a window glass provided on a front side of a terminal main body;
a speaker hole formed on an edge of the terminal main body corresponding to an edge of an outer portion of the window glass, exposed to an outside, and formed to correspond to a speaker provided in the terminal main body; and
a sensor connected to the speaker, and sensing a direction in which the terminal main body is slanted, wherein
the sensor controls the speaker to open or close the speaker hole according to the direction in which the terminal main body is slanted.

2. The mobile communication terminal of claim 1, wherein the sensor is an acceleration sensor for switching a screen of a terminal display.

3. The mobile communication terminal of claim 1, wherein the speaker hole includes a first speaker hole and a second speaker hole provided to a right edge and a left edge at a top of the terminal main body, respectively.

4. The mobile communication terminal of claim 3, wherein when the top of the terminal main body is slanted in a first direction, the first speaker hole is opened and the second speaker hole is closed, and
when the top of the terminal main body is slanted in a second direction, the second speaker hole is opened and the first speaker hole is closed.

5. The mobile communication terminal of claim 1, wherein the speaker hole includes a first speaker hole and a second speaker hole that are provided to a right edge and a left edge at a top of the terminal main body, respectively, and a third speaker hole and a fourth speaker hole that are provided to a right edge and a left edge at a bottom of the terminal main body, respectively.

6. The mobile communication terminal of claim 5, wherein when the top of the terminal main body is inclined in the first direction, the first speaker hole is opened and the second speaker hole is closed, and
when the top of the terminal main body is inclined in the second direction, the second speaker hole is opened and the first speaker hole is closed, and the third speaker hole and the fourth speaker hole are closed.

7. The mobile communication terminal of claim 3, wherein the speaker holes are opened when the terminal main body stands in the vertical direction.

8. The mobile communication terminal of claim 1, wherein a curvature radius of an outer portion edge of the window glass is formed to be greater than a curvature radius of an outer portion edge of the terminal main body.

9. The mobile communication terminal of claim 1, wherein an outer portion edge of the window glass has a corner-cutting form forming a straight line.

10. A mobile communication terminal, comprising:
- a window glass provided on a front side of a terminal main body having a generally rectangular shape with two surfaces, four edges and first, second, third and fourth corners where the four edges meet;
- a first speaker hole formed on a first corner of the terminal main body corresponding to an outer portion of the window glass, exposed to an outside, and formed to correspond to a first speaker provided in the terminal main body;
- a second speaker hole formed on a second corner of the terminal main body corresponding to an outer portion of the window glass, exposed to an outside, and formed to correspond to a second speaker provided in the terminal main body; and
- a sensor connected to the first and second speaker, and sensing a direction in which the terminal main body is slanted, said sensor controls the first and second speakers to open or close the first and second speaker holes according to the direction in which the terminal main body is slanted, with only one of said first speaker hole or said second speaker open at one time.

11. The mobile communication terminal of claim 10, wherein the sensor is an acceleration sensor for switching a screen of a terminal display.

12. The mobile communication terminal of claim 11, wherein when a top of the terminal main body is slanted in a first direction, the first speaker hole is opened and the second speaker hole is closed, and
- when the top of the terminal main body is slanted in a second direction, the second speaker hole is opened and the first speaker hole is closed.

13. The mobile communication terminal of claim 12, further composing:
- a third speaker hole formed on a third corner of the terminal main body corresponding to an outer portion of the window glass, exposed to an outside, and formed to correspond to a third speaker provided in the terminal main body; and
- a fourth speaker hole formed on a fourth corner of the terminal main body corresponding to an outer portion of the window glass, exposed to an outside, and formed to correspond to a fourth speaker provided in the terminal main body.

14. The mobile communication terminal of claim 13, wherein
- when the top of the terminal main body is inclined in the first direction, the first speaker hole is opened and the second speaker hole is closed, and
- when the top of the terminal main body is inclined in the second direction, the second speaker hole is opened and the first speaker hole is closed, and the third speaker hole and the fourth speaker hole are closed.

15. The mobile communication terminal of claim 14, wherein
- the first and second speaker holes are opened and the third and fourth speaker holes are closed when the terminal main body stands in the vertical direction.

16. The mobile communication terminal of claim 14, wherein
- the first, second, third and fourth speaker holes are opened when the terminal main body stands in the vertical direction.

17. The mobile communication terminal of claim 10, wherein
- a curvature radius of an outer portion edge of the window glass is formed to be greater than a curvature radius of an outer portion edge of the terminal main body.

18. The mobile communication terminal of claim 10, wherein
- an outer portion edge of the window glass has a corner-cutting form forming a straight line.

* * * * *